(12) United States Patent
Lindgren et al.

(10) Patent No.: US 11,939,234 B2
(45) Date of Patent: Mar. 26, 2024

(54) OPTIMIZING EFFICIENCY OF A WATER PURIFICATION APPARATUS

(71) Applicants: BAXTER INTERNATIONAL INC., Deerfield, IL (US); BAXTER HEALTHCARE SA, Glattpark (CH)

(72) Inventors: Henrik Lindgren, Genarp (SE); Per-Ola Wictor, Stehag (SE)

(73) Assignees: Baxter International Inc., Deerfield, IL (US); Baxter Healthcare SA., Glattpark (CH)

( * ) Notice: Subject to any disclaimer, the term of this patent is extended or adjusted under 35 U.S.C. 154(b) by 683 days.

(21) Appl. No.: 16/960,699

(22) PCT Filed: Jan. 16, 2019

(86) PCT No.: PCT/EP2019/051042
§ 371 (c)(1),
(2) Date: Jul. 8, 2020

(87) PCT Pub. No.: WO2019/141724
PCT Pub. Date: Jul. 25, 2019

(65) Prior Publication Data
US 2020/0354232 A1    Nov. 12, 2020

(30) Foreign Application Priority Data
Jan. 19, 2018 (SE) .................... 1850058-7

(51) Int. Cl.
*C02F 1/00* (2023.01)
*C02F 1/44* (2023.01)
*C02F 1/469* (2023.01)

(52) U.S. Cl.
CPC .............. *C02F 1/008* (2013.01); *C02F 1/441* (2013.01); *C02F 1/4691* (2013.01);
(Continued)

(58) Field of Classification Search
None
See application file for complete search history.

(56) References Cited

U.S. PATENT DOCUMENTS

| | | |
|---|---|---|
| 5,591,344 A | 1/1997 | Kenley et al. |
| 5,714,060 A | 2/1998 | Kenley et al. |

(Continued)

FOREIGN PATENT DOCUMENTS

| | | |
|---|---|---|
| WO | WO 2014197966 A1 | 12/2014 |
| WO | WO 2017192907 A1 | 11/2017 |

OTHER PUBLICATIONS

International Search Report; International Application No. PCT/EP2019/051042 dated Feb. 21, 2019; 3 Pages.

(Continued)

*Primary Examiner* — Richard C Gurtowski
(74) *Attorney, Agent, or Firm* — K&L Gates LLP

(57) ABSTRACT

A water purification apparatus and method for optimizing efficiency of the water purification apparatus comprising a fluid circuit including a Reverse Osmosis, RO, unit (3), providing a permeate flow, and an electrically controlled deionization unit (4) downstream the RO unit (3) receiving at least part of the permeate flow. The method comprises obtaining (S1) a value indicative of power consumption by the electrically controlled deionization unit and determining (S2) whether the obtained value indicative of the power consumption meets at least one criterion. The method further comprises controlling recirculation of reject water produced by the water purification apparatus, based on a result of the determining (S2), in order to optimize efficiency of the water purification apparatus.

25 Claims, 5 Drawing Sheets

(52) U.S. Cl.
CPC .... *C02F 1/4695* (2013.01); *B01D 2311/2523* (2022.08); *C02F 2209/003* (2013.01); *C02F 2209/006* (2013.01); *C02F 2209/05* (2013.01); *C02F 2209/40* (2013.01)

(56) References Cited

U.S. PATENT DOCUMENTS

| | | | |
|---|---|---|---|
| 2003/0213754 A1* | 11/2003 | Rosen | C02F 1/008 210/96.1 |
| 2005/0103644 A1 | 5/2005 | Wilkins et al. | |
| 2005/0103717 A1 | 5/2005 | Jha et al. | |
| 2008/0135479 A1 | 6/2008 | Jensen et al. | |
| 2008/0156710 A1 | 7/2008 | Onota et al. | |
| 2009/0314658 A1* | 12/2009 | Field | B08B 3/08 204/263 |
| 2013/0248371 A1 | 9/2013 | Grabowski et al. | |
| 2015/0336820 A1 | 11/2015 | Grabosch et al. | |

OTHER PUBLICATIONS

Written Opinion of the International Searching Authority; International Application No. PCT/EP2019/051042; dated Feb. 21, 2019; 7 Pages.

* cited by examiner

OPTIMIZING EFFICIENCY OF A WATER PURIFICATION APPARATUS

PRIORITY CLAIM

The present application is a National Phase of International Application No. PCT/EP2019/051042, filed Jan. 16, 2019, which claims priority to Swedish Application No. 1850058-7, filed Jan. 19, 2018, the entire contents of each of which are incorporated herein by reference and relied upon.

TECHNICAL FIELD

The present invention relates to the field of water purification, and in particular to optimizing efficiency of a water purification apparatus.

BACKGROUND

In many applications involving use of water, there is a need for purifying the water before it is used. Dialysis fluids, for example, may be made from water and concentrates. The dialysis fluids may be infused into the body and the purity of such fluids is strictly controlled. The dialysis fluids may be pre-manufactured in heat sterilized ready to use containers such as bags and delivered to the point of use. Some dialysis treatments require large amounts of dialysis fluid. However, the containers are heavy to carry and difficult to store. It is also costly to transport the containers all over the world.

One approach to address the problem with large volumes of dialysis fluid is to produce the dialysis fluid at the point of use or care. This can be done by dosing and mixing concentrates and water at the point of use. The quality of the water at the point of use may however vary, and should be purified before it is used.

Reverse Osmosis (RO) is a water purification technology that remove contaminants from water by pushing the water under pressure through a semipermeable membrane, a RO membrane. The efficiency of the technology makes it suitable to purify water for use in dialysis. To further improve the purification degree of the water, a polisher may be used downstream the RO membrane.

The process of purifying water creates reject water that conventionally is passed to drain. However, water for purification may be demanded from a limited source.

SUMMARY

It would be beneficial if at least a portion of the reject water could be used instead of being passed to drain.

It is thus an object of the disclosure to optimize the efficiency of the water purification. It is a further object to reduce the energy consumption in terms of water consumption and/or electrical energy consumption for purifying water.

These objectives and others are at least partly achieved by a method and apparatus for optimizing efficiency of a water purification apparatus according to the independent claims, and by the embodiments according to the dependent claims.

According to a first aspect, the disclosure relates to a method for optimizing efficiency of a water purification apparatus comprising a fluid circuit including a Reverse Osmosis, RO, unit, providing a permeate flow, and an electrically controlled deionization unit downstream the RO unit receiving at least part of the permeate flow. The method comprises obtaining a value indicative of power consumption by the electrically controlled deionization unit and determining whether the obtained value meets at least one criterion. The method further comprises controlling a recirculation of reject water produced by the water purification apparatus, based on a result of the determining, in order to optimize efficiency of the water purification apparatus.

By the method, the efficiency of the water purification apparatus may be optimized in terms of energy consumption and time. The energy consumption, in terms of used water and consumed electrical energy, may be kept low, while ensuring a time efficient production of purified water of high purity. It may be assured that the apparatus is working optimally, and thus produce purified water with the largest rate possible with a maintained high purity level, with a minimal energy consumption. The cost for producing the purified water may also be reduced, as the energy consumption may be reduced, compared to previous methods for producing purified water.

According to some embodiments, the controlling comprises increasing the recirculation of reject water in response to determining that the obtained value indicative of power consumption is below a first threshold. The first threshold defines for example an optimal working point for the electrically controlled deionization unit. Thus, if it is determined that the electrically controlled deionization unit has more capacity, i.e. the obtained value is below the first threshold, the recirculation is increased. It is then expected that the electrically controlled deionization unit will consume more power/energy, as the recirculated water adds more contaminants to the feed water to the RO unit.

According to some embodiments, the controlling comprises decreasing the recirculation of reject water in response to determining that the obtained value indicative of power consumption is above a second threshold. The second threshold defines for example an optimal working point for the electrically controlled deionization unit. Thus, if it is determined that the electrically controlled deionization unit is operating beyond its optimal conditions, i.e. the obtained value is above a second threshold, the electrically controlled deionization unit may consume more electrical energy without purifying the water to a sufficient degree. The recirculation of reject water should then be reduced, to reduce the load on the electrically controlled deionization unit.

According to some embodiments, the controlling comprises directing the recirculation of reject water to an incoming flow. Thus, the reject water is recirculated to a point upstream the RO unit, such that it becomes part of the feed flow to the RO unit.

According to some embodiments, the reject water comprises a reject flow from the RO unit, and the controlling comprises controlling a recirculation of the reject flow from the RO unit. The RO unit, when operating, always produces a reject flow, and the reject water that is recirculated may include at least part of this reject flow. Thereby water that is rejected from the RO unit may be re-used instead of passed to drain.

According to some embodiments, the reject water comprises a reject flow from the electrically controlled deionization unit, and the controlling comprises controlling a recirculation of the reject flow from the electrically controlled deionization unit. The electrically controlled deionization unit produces a reject flow of by-product water during the process of purifying water, i.e. concentrate flow and electrode flow, that at least partly may be recirculated to the incoming flow.

According to some embodiments, the method comprises determining whether a recovery rate of the apparatus meets at least one criterion. The recovery rate is a measure of the efficiency of the apparatus.

According to some embodiments, the method comprises determining a quality of incoming water based on the result of at least one of the determining steps. Thus, a quality of the incoming water to the water purification apparatus may be determined. The quality is for example determined based on the amount of ion concentration. The less amount of ion concentration in the water, the greater the quality of the water.

According to some embodiments, the method comprises determining a high quality of the incoming water, in response to determining that the value indicative of power consumption is below or equal to a first threshold, and a recovery rate of the apparatus is above or equal to a first recovery rate threshold. The first threshold defines for example an optimal working point for the electrically controlled deionization unit. The first recovery rate threshold may define a minimum desired recovery of the apparatus. Thus, the incoming water to the water purification apparatus is thus so clean that the electrically controlled deionization unit can operate at optimal conditions in terms of purifying water to a certain purity level with a minimum of energy spent, and the recovery rate of the apparatus is as desired, typically as high as possible. It may also be desired that the purified water is produced as fast as possible, thus with a certain volumetric flow rate, or within a certain time period.

According to some embodiments, the method comprises determining a low quality of the incoming water, in response to determining that the value indicative of power consumption is above a second threshold, and a recovery rate of the apparatus is below a second recovery rate threshold. The recirculation then cannot be increased more to increase the recovery, as the electrically controlled deionization unit already consumes more power/electrical energy than optimal. The second recovery rate threshold may have the same value as the first recovery rate threshold, and may define a minimum desired recovery rate of the apparatus.

According to some embodiments, the method comprises issuing a notification, in response to determining that the value indicative of power consumption is above a second threshold, and the recovery rate of the apparatus is below the second recovery rate threshold. Thus, the operator may be notified that the produced purified water has a low quality.

According to some embodiments, the method comprises stopping water purification, in response to determining that the value indicative of power consumption is above the second threshold, and the recovery rate of the apparatus is below a third recovery rate threshold. Thus, the production of purified water may be automatically stopped if it is determined that the purified water has a low quality.

According to some embodiments, the method comprises monitoring a conductivity of the product flow from the electrically controlled deionization unit, and determining an efficiency of the electrically controlled deionization unit based on whether the conductivity and the value indicative of power consumption meets at least one criterion. Thus, the efficiency of the electrically controlled deionization unit may be determined.

According to some embodiments, the method comprises determining that the electrically controlled deionization unit has insufficient efficiency, in response to determining that the conductivity is increasing while the power consumption is stable during the same period of time. Thus, the efficiency of the electrically controlled deionization unit may be evaluated.

According to a second aspect, the disclosure relates to a water purification apparatus comprising a fluid circuit. The fluid circuit comprises a Reverse Osmosis, RO, unit, arranged to provide a permeate flow and an electrically controlled deionization unit, arranged downstream the RO unit to receive at least part of the permeate flow. The water purification apparatus also comprises a control arrangement comprising a control unit configured to control the control arrangement to perform the following operations: obtain a value indicative of power consumption by the electrically controlled deionization unit, determine whether the obtained value meets at least one criterion; and controlling a recirculation of reject water produced by the water purification apparatus, based on a result of the determining, in order to optimize efficiency of the water purification apparatus.

According to some embodiments, the control unit is configured to control the control arrangement to increase the recirculation of reject water in response to a determination that the obtained value indicative of power consumption is below a first threshold.

According to some embodiments, the control unit is configured to control the control arrangement to decrease the recirculation of reject water in response to a determination that the obtained value indicative of power consumption is above a second threshold.

According to some embodiments, the recirculation of reject water is directed to an incoming flow.

According to some embodiments, the reject water comprises a reject flow from the RO unit and the control unit is configured to control the control arrangement to control recirculation of the reject flow from the RO unit by means of a first valve unit.

According to some embodiments, the reject water comprises a reject flow from the electrically controlled deionization unit and the control unit is configured to control the control arrangement to control recirculation of the reject flow from the electrically controlled deionization unit by means of a second valve unit.

According to some embodiments, the control unit is configured to determine whether a recovery rate of the apparatus meets at least one criterion.

According to some embodiments, the control unit is configured to determine a quality of the incoming water based on the result of at least one of the determining's.

According to some embodiments, the control unit is configured to determine a high quality of the incoming water, in response to a determining that the value indicative of power consumption is below or equal to a first threshold, and a determining that the recovery rate of the apparatus is above or equal to a first recovery rate threshold.

According to some embodiments, the control unit is configured to determine a low quality of the incoming water, in response to a determining that the value indicative of power consumption is above a second threshold, and a determining of a recovery rate of the apparatus that is below a second recovery rate threshold.

According to some embodiments, the control unit is configured to issue a notification, in response to a determining that the value indicative of power consumption is above the second threshold, and a determining that the recovery rate of the apparatus is below the second recovery rate threshold.

According to some embodiments, the control unit is configured to control the control arrangement to stop water purification, in response to a determining that the value indicative of power consumption is above the second threshold, and the recovery rate of the apparatus is below a third recovery rate threshold.

According to some embodiments, the control unit is configured to monitor a conductivity of a product flow from the electrically controlled deionization unit, and to determine an efficiency of the electrically controlled deionization unit based on whether the conductivity and the obtained value indicative of power consumption meets at least one criterion.

According to some embodiments, the control unit is configured to determine that the electrically controlled deionization unit has insufficient efficiency, in response to a determining that the conductivity is increasing while the power consumption is stable during the same period of time.

According to some embodiments, the control unit is configured to determine a recovery rate of the apparatus as a ratio of product flow rate from the electrically controlled deionization unit to incoming flow rate to the RO unit. In other words, the recovery rate of the apparatus is determined as a quotient between the product flow rate from the electrically controlled deionization unit and the incoming flow rate of the incoming water to the RO unit.

According to some embodiments, the electrically controlled deionization unit is any of: an Electrodeionization, EDI, unit, a Capacitive Deionization, CDI, unit or an Electrodialysis Reversal, EDR, unit.

According to a third aspect, the disclosure relates to a computer program comprising instructions to cause the apparatus according to the second aspect to execute the method according to the first aspect.

According to a fourth aspect, the disclosure relates to a computer-readable data carrier having stored thereon the computer program of the third aspect.

DETAILED DESCRIPTION

In the following methods for optimizing efficiency of a water purification apparatus will be described. The efficiency of the purification process of the water purification apparatus is optimized in terms of energy consumption, that is, the amount of water and electrical energy used during production of purified water. The efficiency of the purification process of the water purification apparatus is, in some embodiments, also optimized in terms of production rate.

The water purification apparatus includes a Reverse Osmosis, RO, unit and an electrically controlled deionization unit. Both the RO unit and the electrically controlled deionization unit each produce a reject flow of water and by recirculating some or all of the reject flow of water to the incoming flow to the RO unit instead of passing it to drain, the amount of water used in the apparatus may be reduced. Also, the power consumption by the electrically controlled deionization unit is proportional to the ion concentration in the reject water of the electrically controlled deionization unit. Thus, by monitoring a value indicative of the power consumption by the electrically controlled deionization unit, it can be determined how much reject water to recirculate, in order to keep the voltage, current or power of the electrically controlled deionization unit in or close to a working point of the deionization unit. Thus, the electrically controlled deionization unit has a working point or interval in which it purifies water most efficiently, thus, has the highest production rate with maintained purity. By keeping the electrically controlled deionization unit at the working point or within the interval, the water purification apparatus may be operated efficiently in terms of water consumption and electrical energy consumption, and the cost for producing the purified water may be reduced.

Figure 1:
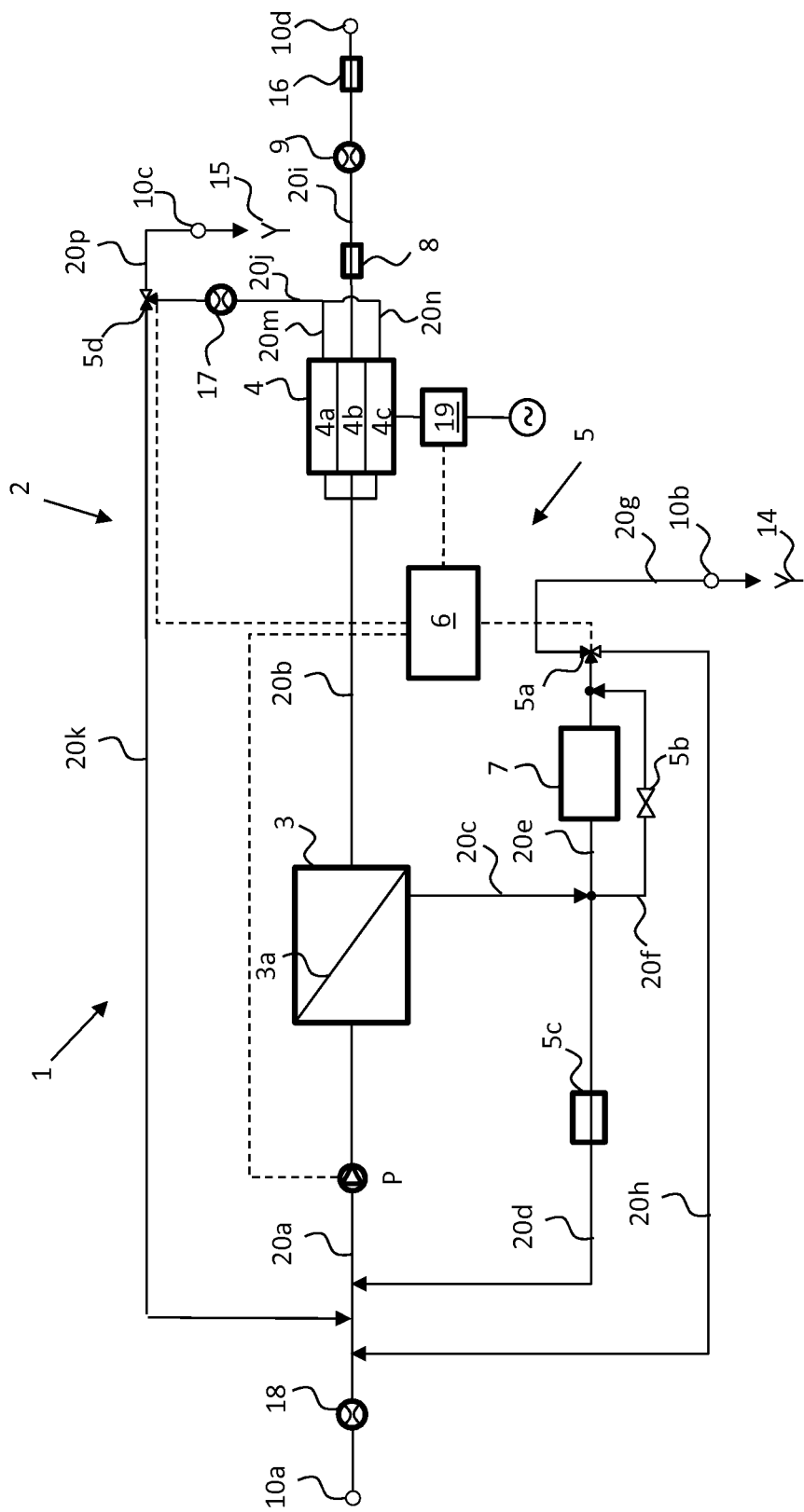
FIG. 1 illustrates a water purification apparatus according to an example embodiment.

FIG. 1 illustrates a water purification apparatus 1 according to an example embodiment. The water purification apparatus 1 comprises a fluid circuit 2 and a control arrangement 5. The fluid circuit 2 comprises a Reverse Osmosis, RO, unit, 3. The RO unit 3 comprises a RO membrane 3a, that is, a semi-permeable membrane designed to allow for passage of water but retain most of the larger molecules such as dissolved salts, particles, bacteria and endotoxins. The fluid circuit 2 also comprises an electrically controlled deionization unit 4, arranged upstream the RO unit 3, to receive at least part of, or all of, the permeate flow from the RO unit 3. The electrically controlled deionization unit, hereinafter referred to as "deionization unit", is for example an Electrodeionization (EDI) unit, a Capacitive Deionization (CDI) unit or an Electrodialysis Reversal (EDR) unit. In some embodiments, the electrically controlled deionization unit 4 comprises one or more electrode channels 4a, one or more product channels 4b and one or more concentrate channels 4c, in case of EDI or EDR. In case of CDI, the electrically controlled deionization unit 4 comprises one channel, that is used alternatingly as product channel and concentrate channel. However, the deionization unit 4 is here generally illustrated to have one of each channel, thus one electrode channel 4a, one product channel 4b and one concentrate channel 4c. In one embodiment, the electrode channel 4a and the concentrate channel 4c are combined. Regarding the EDR, the polarity is reversed now and then to avoid fouling or high concentrations locally in the unit. When the polarity is reversed, the product channel and the concentrate channel switches function. Thus, the product channel(s) becomes concentrate channel(s) and produce concentrate water, and the concentrate channel(s) becomes product channel(s) and produce product water. The output flow from the channels are then redirected e.g. with valves (not shown in figure), to the correct connecting fluid path. As explained, the CDI comprises one channel, that is used during different time periods as product channel or concentrate channel, respectively. Thus, the CDI produce product water and concentrate water alternatingly. During one time period, the CDI produce product water (the channel acts as product channel), and during the next time period the polarity is reversed and the CDI produce concentrate water (reject water), using the same channel in the CDI. The output flow from the channel is then redirected e.g. with valves (not shown in figure), to the correct connecting fluid path in accordance with what is produced in the channel (thus in accordance with the polarity reversal). Thus, if product water is produced, the product water is feed to a product path 20i. If concentrate water is produced, the concentrate water is feed to a second reject path 20j.

A feed fluid path 20a is connected to a feed inlet of the RO unit 3, to provide feed water to the RO unit 3. The feed fluid path 20a may be fluidly connected to an inlet port 10a of the water purification apparatus 1. The inlet port 10a is in return connected to a source of water, e.g. a water tap (not shown), to provide an incoming flow of water. The water is e.g. municipal water. In some embodiments, the water is pre-treated in a pre-treatment module (not shown). The pre-treatment module may include e.g. a particle filter to remove particles, and a bed of activated carbon to remove chlorine and compositions with chlorine from the incoming water and to adsorb toxic substances and pesticides. The pre-treatment is then performed upstream the RO unit 3, thus, the pre-treatment module is arranged upstream the RO unit 3 and downstream the inlet port 10a.

The feed fluid path 20a is fitted with a pump P. The pump P is arranged to provide a high-pressure flow of feed water to the RO membrane 3a from the incoming water. In some embodiments, the incoming water is mixed with recirculated water. The feed water then comprises incoming water plus the recirculated water. Part of the feed water is pushed through the RO membrane 3a and thus purified into a permeate flow. The remaining water, referred to as reject water, is passed from a reject output of the RO unit 3 into a reject fluid path 20c as a reject flow. The reject fluid path 20c is thus connected to the reject output of the RO unit 3. In some embodiments, the apparatus 1 comprises a recirculation path (not shown) arranged for recirculating a part of the permeate water from a point upstream the deionization unit 4, to a point in the feed fluid path 20a upstream the pump P. A (motorized) control valve (not shown) may be arranged to control the flow rate of permeate in the recirculation path.

A flow sensor 18 may be arranged to the feed fluid path 20a to measure the flow rate of the incoming water downstream the inlet port 10a, but upstream the pump P and upstream any connection points of recirculation fluid paths that will be explained in the following. In some embodiments, a flow sensor (not shown) is arranged in the feed fluid path 20a downstream the pump P, to measure the flow rate of the feed water. Alternatively, the pump rate of the pump P may provide a measure of the feed flow rate.

A first recirculation path 20d fluidly connects the reject fluid path 20c and the feed fluid path 20a at a point upstream the pump P, but downstream the flow sensor 18 and thus downstream any pre-treatment module. A restriction device 5c, for example a flow limiter or flow restrictor, arranged to the first recirculation path 20d, is arranged to create a certain pressure on the reject-side of the membrane 3a. It thus limits the flow rate of recirculated reject fluid in the first recirculation path 20d, in dependence of the pump rate of the pump P. The flow rate and pressure in the first recirculation path 20d will thus vary with the pump rate. A path 20e fluidly connects the reject fluid path 20c and a first waste path 20g. The path 20e is connected at one end to the reject fluid path 20c, and at the other end to the first waste path 20g, via a first valve unit 5a. The first waste path 20g is connected at one end to the first valve unit 5a, and at the other end to an output port 10b. The output port 10b is arranged to be connected to a drain 14, for passing of reject water from the RO unit 3 to the drain 14. The path 20e is also fluidly connected to a second recirculation path 20h, via the first valve unit 5a. The second recirculation path 20h is connected at one end to the first valve unit 5a, and at the other end connected to the feed path 20a upstream the pump P, but downstream the flow sensor 18. The first valve unit 5a is arranged to selectively direct rejected water from the RO unit 3 into the second recirculation path 20h and the first waste water path 20g. The first valve unit 5a is here a three-way valve. The first valve unit 5a may alternatively be exchanged with one or several proportional valves. The path 20e is fitted with a valve device 7. The valve device 7 is arranged to provide a constant flow in the path 20e. A bypass valve 5b is fitted to a bypass path 20f arranged to fluidly bypass the valve device 7. The bypass path 20f is fluidly connected at one end to the path 20e upstream the valve device 7, and at the other end to the path 20e upstream the first valve unit 5a and downstream the valve device 7. The reject flow from the RO unit 3 is separated into a first reject flow passed via the first recirculation path 20d, and a second reject flow passed via the fluid path 20e. The first reject flow is always recirculated to the incoming flow. The second reject flow is directed to waste via the first waste water path 20g or is recirculated via the second recirculation path 20h, controlled by the first valve unit 5a. In an alternative embodiment, the first recirculation path 20d is not present, and the first valve unit 5a is arranged to selectively direct all rejected water from the RO unit 3 into either the second recirculation path 20h or the first waste water path 20g.

The permeate flow is passed from the RO unit 3 into a permeate fluid path 20b. The permeate fluid path 20b is fluidly connected to a permeate output of the RO unit 3 and to the channels of the deionization unit 4. The permeate fluid path 20b thus fluidly connects the RO unit 3 and the deionization unit 4. In other words, the deionization unit 4 is fitted to the permeate fluid path 20b. The permeate fluid path 20b pass the permeate fluid to the channel or channels 4a, 4b, 4c of the deionization unit 4. The deionization unit 4 is thus arranged to receive the permeate flow. The deionization unit 4 is in some embodiments configured to produce product water in the product channel 4b. In some other embodiments, product channel 4b is used for producing concentrate water, e.g. when the voltage is reversed. In some embodiments, the product channel 4b is alternately used for producing product water and concentrate water. One or several valves (not shown) and paths may be arranged to direct product water from the product channel 4b or concentrate channel 4a, depending on where and when the product water is produced, into the product path 20i.

The deionization unit 4 outputs a product water flow into a product fluid path 20i fluidly connected to the product channel 4b. The product water may be retrieved via a port 10d of the water purification apparatus 1, fluidly connected to the product fluid path 20i. In some embodiments, a flowrate sensor 9 is arranged to the product path 20i to measure the flow rate of the product water. In some embodiments, a product flow valve 16 is arranged to the product path 20i to control the flow of product water in the product path 20i. In some embodiments, the conductivity is measured by means of a conductivity sensor 8 or cell arranged to measure the conductivity of the product water in the product flow path 20i downstream the deionization unit 4.

The deionization unit 4 makes use of electrodeionization for removing ions from the permeate water, such as aluminum, lead, cadmium, chromium, sodium and/or potassium etc., which have penetrated the RO membrane 3a. The deionization unit 4 utilizes electricity, ion exchange membranes and, in some cases resin, to deionize the permeate water and separate dissolved ions, i.e. impurities, from the permeate water. The deionization unit 4 produce product water, polished by the deionization unit 4 to a higher purity level than the purity level of the permeate water. The deionization unit 4 is connected to a power network or a battery via a power control unit 19. The power control unit 19 is arranged to be connected to the power network or the battery, and is arranged to transform the power from the power network or the battery as required by the deionization unit 4, e.g. to an appropriate current or voltage.

More in detail, the deionization unit 4, when an EDI, produce concentrate water in the concentrate channel 4a. When the deionization unit 4 is an EDR, the deionization unit 4 produce concentrate water in either of the concentrate channel 4a and the product channel 4b. When the deionization unit 4 is a CDI, the deionization unit 4 produce concentrate water alternatingly in the product channel 4b. The concentrate water contains ions removed from the permeate water. The concentrate water is passed as a concentrate fluid flow into a concentrate path 20m fluidly connected to the concentrate channel 4a. One or several valves (not shown) and paths may be arranged to direct concentrate water from the concentrate channel 4a or product channel 4b, depending on where and when the concentrate water is produced, into the concentrate path 20m or reject path 20j. In some embodiments, the deionization unit 4 produce electrode water in the electrode channel 4c. The electrode water for example comprises gas etc. The electrode water is passed as an electrode fluid flow into an electrode path 20n fluidly connected to the electrode channel 4c. In some embodiments, the concentrate path 20m and the electrode path 20n are united or combined into a single second reject path 20j. In other words, the concentrate path 20m and the electrode path 20n are connected to a second reject path 20j. The second reject path 20j is fluidly connected, via a second valve unit 5d, to a second waste water path 20p arranged to pass reject water from the deionization unit 4 to a drain 15. The second reject path 20j is also fluidly connected, via the second valve unit 5d, to a third recirculation path 20k being in fluid communication with the feed fluid path 20a upstream the pump P, but downstream the flow sensor 18. The third recirculation path 20k is thus at one end connected to the second valve unit 5d, and at the other end connected to the feed fluid path 20a. The second valve unit 5d is arranged to selectively pass rejected water from the deionization unit 4 into the third recirculation path 20k and the second waste water path 20p. The second valve unit 5d is here a three-way valve. The second valve unit 5d may alternatively be exchanged with one or several proportional valves. A flow sensor 17 is arranged to measure the flow rate in the second reject path 20j, and thus the flow rate of the reject water from the deionization unit 4. Alternatively, the concentrate path 20m and the electrode path 20n are separate paths or channels that are not united or connected to a common path. The concentrate path 20m and the electrode path 20n may then each be fluidly connected to an individual, separate, third recirculation path connected to the feed fluid path 20a, and an individual, separate, second waste water path connected to the drain 15. Both the concentrate flow and the electrode flow may then each be controlled by means of an individual second valve unit, to selectively pass the concentrate flow and/or the electrode flow into the respective third recirculation path to the incoming flow or respective second waste water path to drain. Still alternatively, only one of the concentrate flow and the electrode flow (e.g. the concentrate flow) is arranged to be recirculated, the other of the flows (e.g. the electrode flow) may always be passed to drain. Flow sensors may then be arranged to the paths leading to drain, to measure the drain flow rate (not shown).

The control arrangement 5 also comprises a control unit 6. The control unit 6 comprises a processor and a memory. The processor comprises one or several Central Processing Units (CPUs). The memory comprises one or several memory units. The control unit 6 comprises a computer program comprising instructions which, when the program is executed by the control unit 6, cause the control unit 6 and a thereto connected water purification apparatus 1 to carry out a method for controlling efficiency of the water purification apparatus, according to any of the embodiments as described herein. The control unit 6 is thus programmed to perform the method according to any of the embodiments as described herein, by means of the water purification apparatus 1. The computer program may be stored on a computer-readable data carrier. The control unit 6 is configured to control the control arrangement 5, thus the first valve device 5a, the second valve device 5d, and the pump P, and any auxiliary devices, valves etc. as needed in other embodiments described herein. The control unit 6 is further configured to obtain a value indicative of a power consumed by the deionization unit 4. The control unit 6 is thus configured to monitor the power, current and/or voltage to the deionization unit 4, and other sensors such as the flowrate sensor 9, to obtain measured or detected values therefrom. The control unit 6 is for example configured to obtain, e.g. to receive or collect, values indicative of the power consumed by the deionization unit 4, from the power control unit 19. A value indicative of the power consumption of the deionization unit 4 is for example the current or voltage consumed by the deionization unit 4. The values indicate the electrical usage of the deionization unit 4, and may be measured values of the current or voltage. The power used by the deionization unit 4 may be calculated from the measured values. The power control unit 19 for example includes electric meters that measures or reacts to the electrical flow, thus current and/or voltage, passed from the power control unit 19 to the deionization unit 4. In some embodiments, the voltage is constant. Only the current then varies depending on how much power the deionization unit 4 consumes. Then, only the current needs to be monitored to find out the electrical usage of the deionization unit 4. In some embodiments, the current is constant. Only the voltage then varies depending on how much power the deionization unit 4 consumes. Then, only the voltage needs to be monitored to find out the electrical usage of the deionization unit 4. Alternatively, the voltage or current is set to a predetermined value, and the other of the voltage and current varies depending on how much power the deionization unit 4 consumes. The measurement is for example made in ampere or voltage, and may be translated into energy (watt hours), or power at a certain point in time (watt) or how the power (watt) varies over time. Alternatively, the value indicative of a power consumption is indicative of a temperature of the deionization unit 4. A temperature sensor (not shown) is then arranged to measure the temperature of the deionization unit 4, for example the temperature of the reject water. Thus, the temperature is correlated with the power consumption, if the power consumption increases, so does the temperature, and if the power consumption decreases, the temperature also decreases. For these purposes, and others, the control unit 6 is connected to the units, devices, valves, the pump, the sensors described herein, by wire or wirelessly. Some connections are indicated in FIG. 1 by dashed lines.

A method for optimizing efficiency of a water purification apparatus will now be described with reference to the flow charts in FIGS. 2 to 6. The method is for example executed by the water purification apparatus 1 illustrated in FIG. 1. The method comprises obtaining S1 a value indicative of power consumption by the deionization unit 4. For example, the control unit 6 monitors the current, voltage or power supplied to the deionization unit 4 from the power control unit 19, as previously explained. A varying current or voltage is indicative of a power consumed by the deionization unit 4. If one of them is predetermined or constant, it follows that this value already is or may be known. The present power consumption may be calculated from the current and voltage. Thus, a value indicative of the power consumed by the deionization unit 4 may be continuously monitored by the control unit 6.

The method further comprises determining S2, S2a, S2b whether the obtained value indicative of power consumption meets at least one criterion, and controlling recirculation of reject water produced by the water purification apparatus 1, based on a result of the determining S2, in order to optimize efficiency of the water purification apparatus 1. The reject water is for example produced at the same time, thus during the same time period, as the product water is produced, which is the case for EDI and EDR. For CDI, the reject water is produced during a time period following a time period during which product water has been produced.

Thus, the control unit 6 is configured to determine whether the obtained value indicative of power consumption meets at least one criterion. The control unit 6 is further configured to control, by means of the control arrangement 5, a recirculation of reject water produced by the water purification apparatus 1, based on a result of the determining, in order to optimize efficiency of the water purification apparatus.

The total reduction of ions in the water purification apparatus 1 is determined by the RO membrane 3a and the deionization unit 4 in collaboration. A rejection ratio of the RO unit 3 is the percentage of solids concentration removed from the feed water by the RO membrane 3. The ion rejection ratio in the RO unit 3 is controlled by adjusting the relation between reject water versus permeate water. The total reduction of ions in the apparatus 1 is depending on the efficiency in each step, the RO unit 3 and the deionization unit 4.

The current or power consumption of the deionization unit 4 is proportional to the amount of water cleaving ($H_2O$+electrical energy→$O_2$+2 $H_2$). The current or power consumption of the deionization unit 4 is also proportional to the ion transport in the deionization unit 4 which is proportional to the ion concentration of the permeate water. This can be used to optimize the efficiency of the water purification, while decreasing the amount of reject water passed to drain. Thus, by keeping the current, voltage or power consumed by the deionization unit 4 at a certain working point or within an interval, the deionization unit 4 works most efficiently, thus, it produces the greatest amount purified water possible with a desired high purity level of the produced water. According to one embodiment, the voltage used by the deionization unit 4 is constant, and specified by the manufacturer or user. The power consumption may then be determined by the current consumption. In one embodiment, the deionization unit 4 consumes a constant voltage of 24V. An optimal working interval for the current may then be between 10 mA-150 mA, and the maximum power consumed is 24 Watt. The first threshold is thus 10 mA, and the second threshold is 150 mA. Alternatively, the current consumed by the deionization unit 4 is constant, and specified by the manufacturer or user. The power consumption may then be determined by the voltage consumption. In one embodiment, the deionization unit 4 consumes a constant current of 2 A. An optimal working interval for the voltage may then be between 8V-15V, and the maximum allowed consumed power is 50 Watt. The first threshold is then 8V, and the second threshold is 15V. According to still another embodiment, the current or voltage used by the deionization unit 4 is constant and depends on the working point, as specified by the manufacturer or user. For example, the voltage is first held constant, and the current is allowed to vary. When the current reaches a predetermined value, the current is held constant at this predetermined value by varying the voltage. Thus, both the voltage and the current may be allowed to vary.

The current, voltage or power consumed by the deionization unit 4 is controlled by changing the working load on the deionization unit 4. If the ion concentration in the permeate water increases, the deionization unit 4 consumes more power. By recirculating reject water, which thus comprises a higher concentration of ions and other impurities such as oxygen, hydrogen and chlorine than the incoming water, to the incoming water to the pump P, the impurity concentration and thus the ion concentration of the feed water, and thus also of the permeate water, will increase compared to before recirculation. The deionization unit 4, which receives the permeate water, will then consume more power to maintain the desired high purity level of the produced water. In one example embodiment, the method comprises increasing S3a1, S3a2 the recirculation of reject water in response to determining S2a that the obtained value indicative of power consumption is below a first threshold. The first threshold is for example a first power threshold, a first current threshold or a first voltage threshold, respectively. Thus, as long as the value indicative of power consumption of the deionization unit 4 is below the first threshold, the deionization unit 4 has more capacity and more reject water may be recirculated to the incoming flow instead of being passed to drain. The control unit 6 is thus configured to control the control arrangement 5 to increase the recirculation of reject water in response to a determination that the obtained value indicative of power consumption is below the first threshold. The recirculation of reject water is here increased or decreased in terms of flow rate or volume rate.

In one example embodiment, the method comprises decreasing S3b1, S3b2 the recirculation of reject water in response to determining S2b that the obtained value indicative of power consumption is above a second threshold. The second threshold is for example a second power threshold, a second current threshold or a second voltage threshold, respectively. Thus, if the power, current or voltage of the deionization unit 4 is above the second threshold, respectively, the deionization unit 4 will not produce at the desired high purity level and less reject water should be recirculated to the incoming flow. The recirculation of reject water is thus directed to the incoming flow of the RO unit 3, to a point of the feed fluid path 20a upstream the pump P. In some embodiments, if a pre-treatment step is included, the reject water may be recirculated to a point of the feed fluid path 20a downstream the pre-treatment step, but still upstream the pump P and the RO unit 3. The control unit 6 is thus configured to control the control arrangement 5 to decrease the recirculation of reject water, thus decrease the amount of recirculated reject water, in response to the determination that the obtained value indicative of power consumption is above the second threshold.

The first threshold may be equal to the second threshold. In such case, the first power threshold will have the same value as the second power threshold, the first current threshold will have the same value as the second current threshold. If the current is constant, the voltage is allowed to vary. Then, the first voltage threshold may have the same value as the second voltage threshold. The thresholds will then define a working point where the deionization unit 4 purifies water most efficiently. Alternatively, the first power threshold, first current threshold or first voltage threshold has a lower value than the second power threshold, second current threshold or second voltage threshold, respectively. The thresholds then delimit an interval where the deionization unit 4 purifies water most efficiently. According to one embodiment, if the consumed power, current or voltage is in this interval, respectively, the currently recirculated reject flow is not changed. The method may then continue to step S1. Also, if the value indicative of power consumption is equal to the first threshold, and the first and the second thresholds are equal, the currently recirculated reject flow is not changed and the method is returned to step S1. In some embodiments, the step S2a is always performed before step S2b.

The reject flow may include a reject flow from the RO unit 3 and/or a reject flow from the deionization unit 4. In one example embodiment, where the reject water comprises a reject flow of water from the RO unit 3, the method comprises controlling S3 a recirculation of the reject flow from the RO unit 4. The recirculation of reject flow of water from the RO unit 3 is controlled by means of the first valve unit 5a. Thus, the control unit 6 is controlling the control arrangement 5 to control recirculation of the reject flow of the RO unit by means of the first valve unit 5a. By directing the reject flow of water in the path 20e to the second recirculation path 20h, by means of the first valve unit 5a, the reject flow from the RO unit 3 is directed to the feed flow path 20a of the RO unit 3. The recovery rate of the apparatus 1 is thereby increased, see step S3a1. Alternatively, by directing the reject flow of water in the path 20e to the first waste path 20g, by means of the first valve unit 5a, the reject flow from the RO unit 3 is directed to the drain 14. The recovery rate of the apparatus 1 is thereby decreased, see step S3b1. By directing the reject flow to drain 14, water with impurities rejected by the RO membrane 3a can be removed.

In one embodiment, where the reject water comprises a reject flow of water from the deionization unit 4, the method comprises controlling S3 a recirculation of the reject flow of water from the deionization unit 4. The recirculation of reject flow of water from the deionization unit 4 is controlled by means of the second valve unit 5d. Thus, the control unit 6 is configured to control the control arrangement 5 to control recirculation of the reject flow from the deionization unit 4 by means of a second valve unit 5d. By directing the reject flow of water in the second reject path 20j to the third recirculation path 20k, by means of the second valve unit 5d, the reject flow from the deionization unit 4 is directed to the feed flow path 20a of the RO unit 3, see step S3a2. The recovery rate of the apparatus 1 is thereby increased. Alternatively, by directing the reject flow of water in the second reject path 20j to the second waste path 20p, by means of the second valve unit 5d, the reject flow from the deionization unit 4 is directed to the drain 15, see step S3b2. The recovery rate of the apparatus 1 is thereby decreased. In some embodiments, the reject flow from the deionization unit 4 comprises concentrate flow and electrode flow of the deionization unit 4.

The recovery rate of the apparatus 1 is determined as a ratio of product flow rate from the deionization unit 4 to incoming flow rate of incoming water (before being mixed with recirculated water) to the RO unit 3, thus:

$$\text{Recovery rate of apparatus} = \frac{\text{Product flow rate}}{\text{Incoming flow rate}} = \frac{\text{Product flow rate}}{\text{Product flow rate} + \text{drain flow rate}} \quad (1)$$

The incoming flow rate is equal to the product flow rate plus the drain flow rate. The recovery rate of the apparatus 1 may thus be determined as a ratio of product flow rate from the deionization unit 4, to the sum of product flow rate plus drain flow rate. A measure of the product flow rate is obtained from the flowrate sensor 9 and sent to the control unit 6. The drain flow rate of the RO unit 3 may be determined by measuring how long time the first valve unit 5a is open to drain 14, and multiplying the time with the known constant flow rate determined by the constant flow valve device 7. Alternatively, the drain flow rate of the RO unit 3 is measured by a flow sensor (not shown) arranged e.g. to the first waste path 20g. The drain flow rate of the deionization unit 4 may be determined by measuring how long time the second valve unit 5d is open to drain 15, and multiplying the time with the flow rate in the second reject path 20j, measured by the flow sensor 17. The drain flow rate is thus the flow rate of the reject water that is passed to drain. The drain flow rate in equation (1) is the total drain flow rate, thus the sum of the drain flow rate of the RO unit 3 and the drain flow rate of the deionization unit 4. Based upon the rates, the control unit 6 may thus determine the recovery rate of the apparatus 1. The incoming flow rate of the incoming water may be measured by the flow sensor 18. The recovery rate of the apparatus 1 should not be confused with the recovery rate of the RO unit 3.

According to some embodiments, the recovery rate of the RO unit 3 is set to a predetermined rate and is constant. The recovery rate of the RO unit 3 is determined as the permeate flow rate to feed flow rate. The permeate flow rate may be measured with a permeate flow rate sensor arranged to measure the permeate flow rate in the permeate fluid path 20b. The feed flow rate may be measured with a feed flow rate sensor arranged to measure the feed flow rate in the feed fluid path 20a e.g. downstream the pump P.

The determined recovery rate of the apparatus 1 may be used to monitor the status of the water purification apparatus 1. Reference is now made to the flowcharts of FIGS. 3 and 4, where methods for using the recovery rate of the apparatus 1 are illustrated. Here, the method comprises determining S4 whether the recovery rate of the apparatus 1 meets at least one criterion. The control unit 6 is thus configured to determine whether the recovery rate of the apparatus 1 meets the certain criterion. For example, the method comprises determining S5a, S5b a quality of the incoming water based on the result of at least one of the determining steps S2, S4. To determine a quality of the incoming water may here mean to determine if the incoming water, before the incoming water is mixed with recirculated water, is of a high quality, a sufficient quality or a low quality. The control unit 6 is configured to determine a quality of the incoming water based on the result of at least one of the determining's in the steps S2 and S4.

Figure 2:
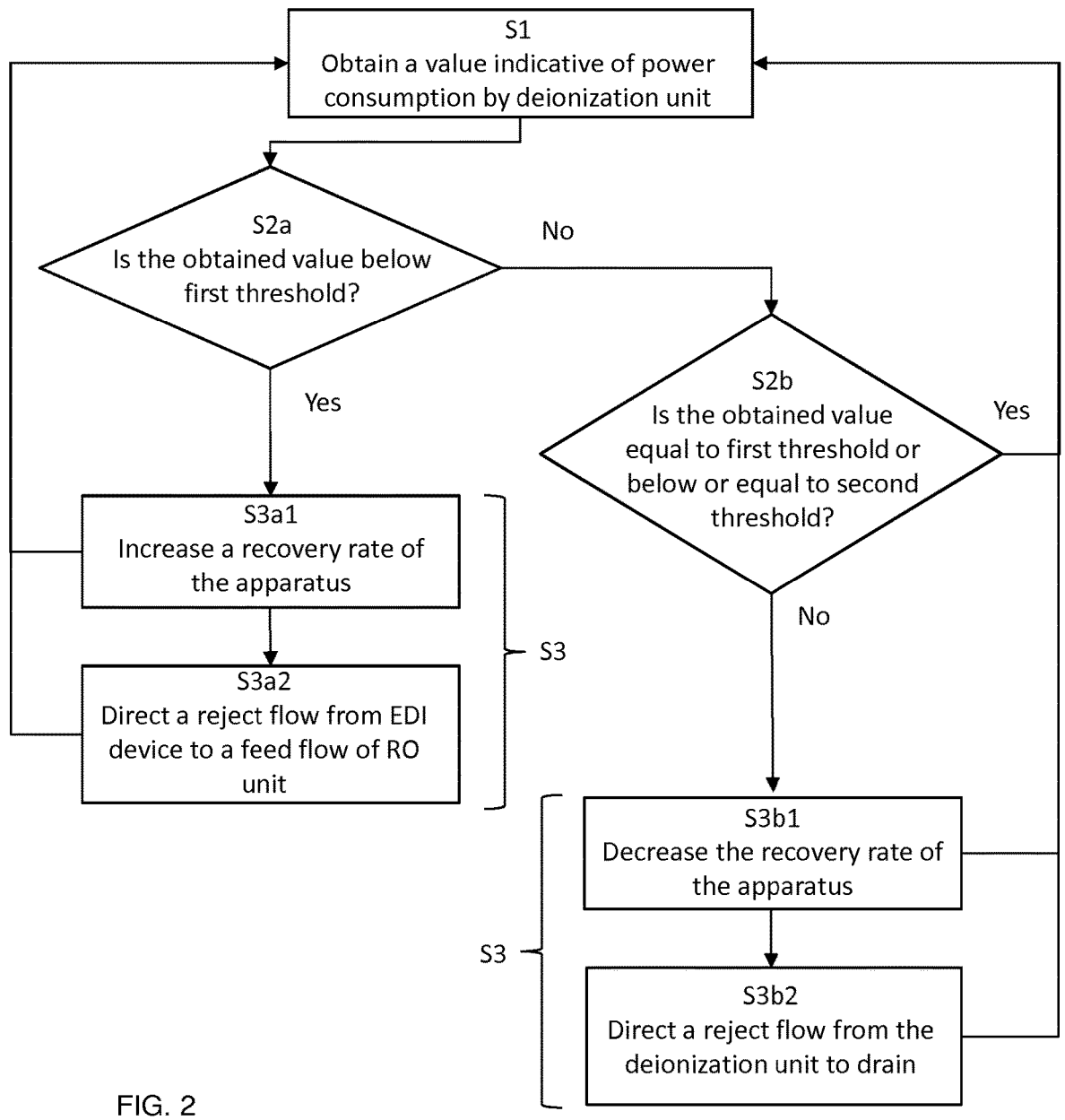
FIG. 2 illustrates a flow chart of a method for controlling water purification according to some embodiments.
Figure 3:
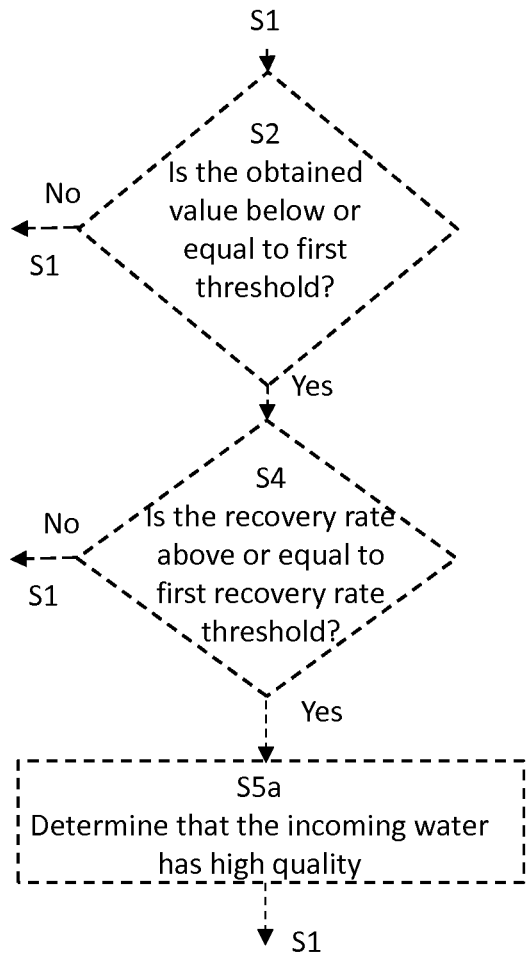
FIGS. 3 and 4 illustrate flow charts of methods for determining quality of the incoming water according to some embodiments.

The flowchart in FIG. 3 is a continuation of the step S1 in FIG. 2. In this example embodiment, the method comprises determining S5a a high quality of the incoming water, in response to determining S2, S4 that the value indicative of power consumption by the deionization unit is below or equal to the first threshold, and the recovery rate of the apparatus 1 is above or equal to a first recovery rate threshold. Thus, an estimation of the incoming water quality may be done using the power, current or voltage consumption of the deionization unit 4 in combination with the recovery rate of the apparatus 1. A power, current or voltage consumption at the optimal working point or lower in combination with a desired high recovery rate indicate that the incoming water quality is high, thus the incoming water is very clean. Thus, by optimizing the operating point of the deionization to be as high as possible (thus as close to the optimal working point as possible), in terms of power, current or voltage, the amount of reject water passed to drain can be minimized when there is clean enough incoming water. In one embodiment, a high quality of the water means an ion concentration of the incoming water below a lower ion concentration threshold.

Moreover, the method may include the requirement to have high or sufficient quality of the incoming water, to allow the water purification apparatus 1 to produce purified water. The steps S4 and S5a may be performed before or after any one of the steps S3a1 and S3a2. The control unit 6 is thus configured to determine that the incoming water has a high quality, in response to determining that the value indicative of power consumption by the deionization unit 4 is below or equal to the first threshold.

Figure 4:
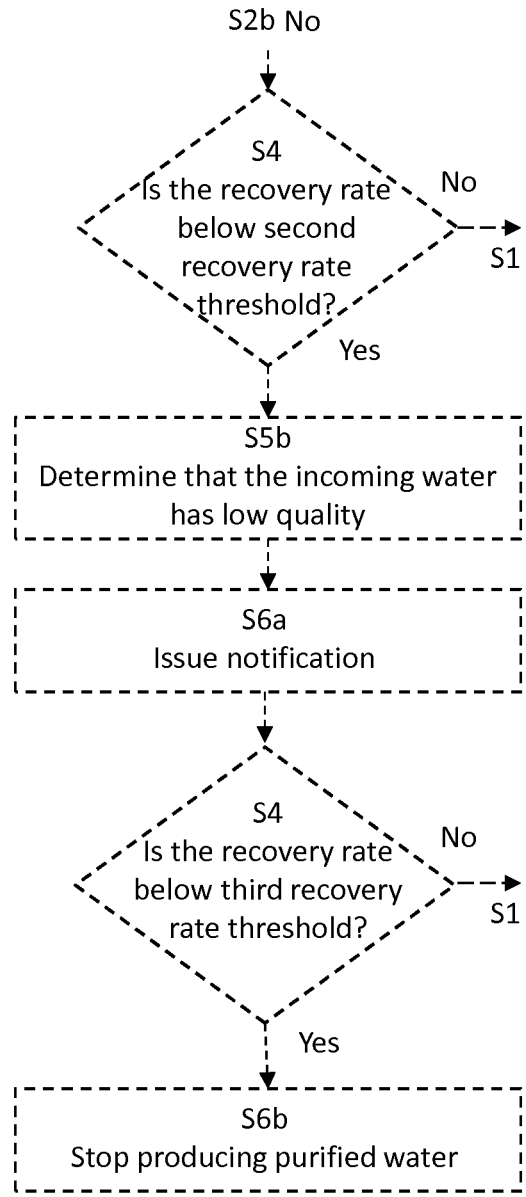

The flowchart in FIG. 4 is a continuation of the step S2b in FIG. 2, where the answer is "No". Here, the obtained power or current is thus above a second threshold, and the recirculation should thus be decreased. In one example embodiment, the method comprises determining S5b a low quality of the incoming water, in response to determining S2, S4 that the value indicative of power consumption by the deionization unit 4 is above the second threshold, and a recovery rate of the apparatus 1 is below a second recovery rate threshold. Thus, a high power, current or voltage in combination with a low recovery rate indicate that the incoming water quality is lower than the water purification apparatus 1 is designed to handle. Then, the incoming water is not sufficiently clean for the apparatus 1. The second recovery rate threshold may have a lower value than the first recovery rate threshold. In one embodiment, the first recovery rate is equal to the second recovery rate. If the recovery rate then is equal to the first recovery rate, it may be determined that the incoming water is of sufficient or high quality. The control unit 6 is thus configured to determine a low quality of the incoming water, in response to a determining that the value indicative of power consumption by the deionization unit 4 is above the second threshold, and in response to a determining of a recovery rate of the apparatus 1 that is below the second recovery rate threshold. In one embodiment, a low quality of the water means an ion concentration of the incoming water above a high ion concentration threshold. The high ion concentration threshold is greater than the low ion concentration threshold.

If the incoming water is of low quality, the operator or user should be notified to be able to take proper action. Thus, in one example embodiment, the method comprises issuing S6a a notification, in response to determining S2b, S4 that the value indicative of power consumption by the deionization unit 4 is above the second threshold, and the recovery rate of the apparatus 1 is below the second recovery rate threshold. The control unit 6 is thus configured to issue the notification, in response to determining that the power, current or voltage consumed by the deionization unit 4 is above the second power, current or voltage threshold, respectively, and determining that the recovery rate of the apparatus 1 is below a second recovery rate threshold. The notification may include a sound or replay of a recorded message from a loud speaker, and/or a visual notification such as lightening of a lamp or a flashing lamp, and/or a text message on a display (not shown) of the water purification apparatus 1. The control unit 6 is then connected to such loud speaker, lamp or display. The operator is then notified, and may stop water production.

In one example embodiment, the method comprises stopping S6b water purification, in response to determining S2b, S4 that the value indicative of power consumption by the deionization unit 4 is above the second threshold, and the recovery rate of the apparatus 1 is below a third recovery rate threshold. In one embodiment, the third recovery rate threshold is equal to the second recovery rate threshold. Then, the process of purifying water is stopped at the same time as a notification is issued. The operator will thus be notified that the incoming water is of low quality and the water purification apparatus 1 will automatically stop purifying water. In one embodiment, the production of water with low quality is only allowed for a certain time period, e.g. 1-2 minutes. If the water production has not been stopped manually within this certain time period, the water production will be stopped automatically. The control unit 6 is thus configured to control the control arrangement 5 to stop water purification, in response to determining that the value indicative of power consumption by the deionization unit 4 is above the second power or current threshold, and the recovery rate of the apparatus 1 is below the third recovery rate threshold. The purification of water may be stopped by stopping the pump P, and/or closing an inlet flow valve (not shown) upstream the pump P, and/or closing the product flow valve 16. In an alternative embodiment, the third recovery rate threshold may have a lower value than the second recovery rate threshold. The third recovery rate threshold will then act as a safety guard against continuing producing water with too low quality.

Figure 5:
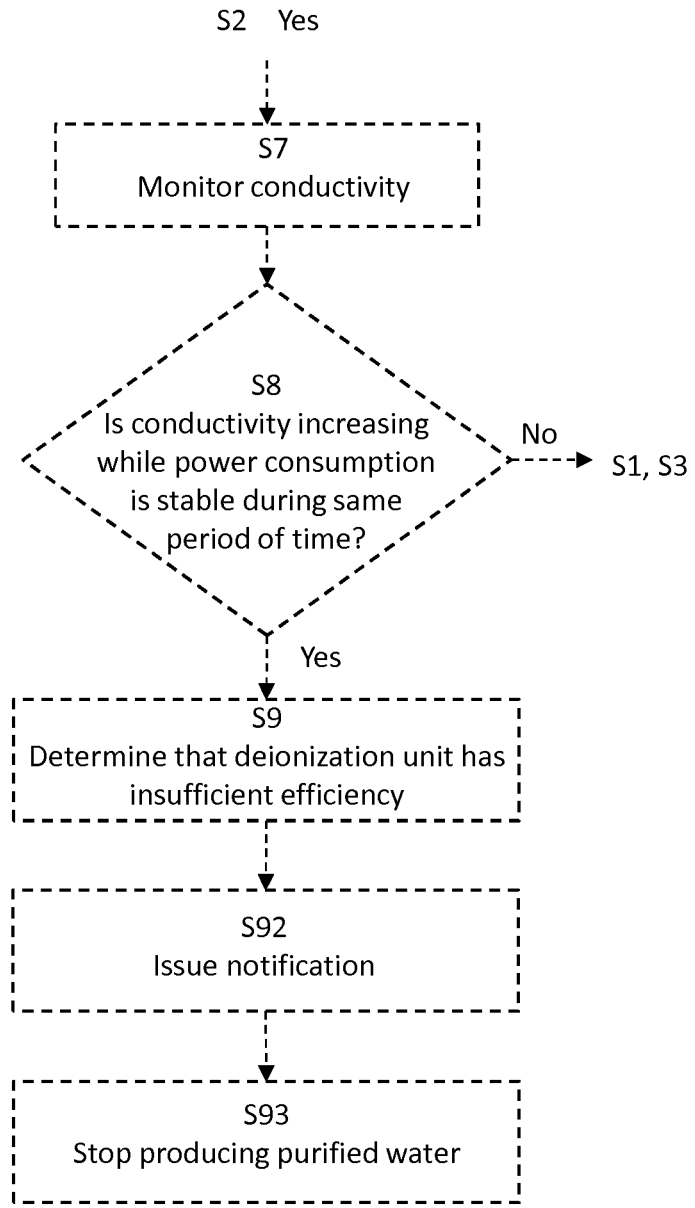
FIGS. 5 and 6 illustrate flow charts of methods for determining if the electrically controlled deionization unit is working efficiently, according to some embodiments.
Figure 6:
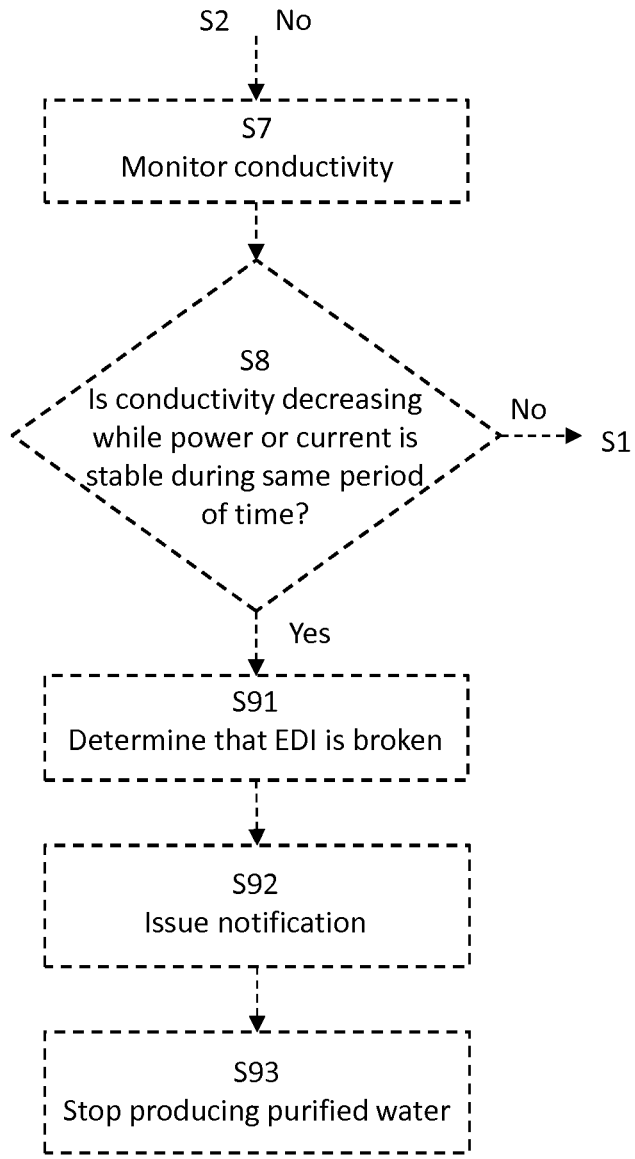

FIGS. 5 and 6 are flowcharts of methods for determining the status of the deionization unit 4 according to some embodiments. The methods comprise monitoring S7 a conductivity of a product flow from the deionization unit 4, and determining S9 an efficiency of the deionization unit 4 based on whether the conductivity and the value indicative of power consumption meet at least one criterion, respectively. The control unit 6 is thus configured to monitor a conductivity of the product flow, and to determine an efficiency of the deionization unit 4 based on whether the conductivity and the obtained value indicative of power consumption meets at least one criterion, respectively. The conductivity is for example measured by means of the conductivity sensor 8 or cell in the product flow path 20i downstream the deionization unit 4. The conductivity measurement is communicated to the control unit 6, e.g. by wire. The conductivity is here measured during a period of time; thus, a plurality of measured conductivity values is monitored. The flowchart in FIG. 5 is a continuation of the step S2, thus the step S2a or S2b, in FIG. 2, where the answer to the step S2 is "Yes" and thus the obtained value indicative of power consumption is below a power, current or voltage threshold. In this embodiment, the at least one criterion comprising determining S9 that the deionization unit 4 has insufficient efficiency, in response to determining S8 that the conductivity is increasing while the obtained value indicative of power consumption is stable during the same period of time. The control unit 6 is thus configured to determine that the deionization unit 4 has insufficient efficiency, in response to a determining that the conductivity is increasing while the power consumption is stable during the same period of time. In other words, a plurality of values indicative of power consumption by the deionization unit 4 are obtained during the period of time, by the control unit 6. In more detail, if this plurality of power, current or voltage values are stable, thus, they are only allowed to vary within a small interval, and the conductivity values are increasing, e.g. with at least a certain gradient, it is determined that the deionization unit 4 has insufficient efficiency. As the power, current or voltage already is below the certain threshold, the power, current or voltage, respectively, of the deionization unit 4 should be increased with an increased conductivity load. However, if it has an insufficient capacity for the load, it cannot handle the purification task of the system. If the step S8 is not true, the method may include to continue to the next step, e.g. step S1 or S3. If it is determined S9 that the deionization unit 4 has insufficient efficiency, this state may be notified to the operator or user. Thus, the method may include issuing S92 a notification. The notification may be accomplished as has been previously described. Further, in response to a determination S9 that the deionization unit 4 has insufficient efficiency, the method may include to stop producing S93 purified water.

The flowchart in FIG. 6 is a continuation of the step S2, thus any of the steps S2a or S2b, in FIG. 2, where the answer to the step S2 is "No" and thus the obtained power, current or voltage is above a power, current or voltage threshold, respectively. In this embodiment, the certain criterion comprises determining S9 that the deionization unit 4 is broken, in response to determining S8 that the conductivity is decreasing while the power consumption is stable during the same period of time. In other words, a plurality of values indicative of power consumption are obtained during the period of time. In more detail, if this plurality of power, current or voltage values are stable, thus, they are only allowed to vary within a small interval, and the conductivity values are decreasing, e.g. with at least a certain gradient, it is determined that the deionization unit 4 is broken. As the power, current or voltage already is above the certain power, current or voltage threshold, the power, current or voltage of the deionization unit 4 should be decreased with an increased conductivity load. However, if the deionization unit 4 is broken, its current, power or voltage won't follow an expected behavior. If the step S8 is not true, the method may include to continue to the next step, e.g. step S1 or S3. If it is determined S91 that the deionization unit 4 is broken, this state may be notified to the operator or user. Thus, the method may include issuing S92 a notification. The notification may be accomplished as has been previously described. Further, in response to a determination S91 that the deionization unit 4 is broken, the method may include to stop producing S93 purified water.

The method is in some embodiments performed simultaneously as product water is produced by the apparatus 1. Generally, the RO-unit 3 continuously produce reject water while product water is produced. In some embodiments, for example when the electrodeionization unit 4 is an EDI or an EDR, the electrodeionization unit 4 also continuously produce reject water while product water is produced. In some other embodiments, for example when the electrodeionization unit 4 is a CDI, the electrodeionization unit 4 produce product water during one time period, and produce concentrate water (thus reject water) during a following time period while product water is not produced. During the time period when product water is produced, the power consumption is monitored, and the value indicative of power consumption of the CDI is obtained. This value is for example a maximum value of the power, voltage or current consumed by the CDI during the time period when product water is produced. Alternatively, the value is an average, mean or median value of the power, voltage or current consumed by the CDI during the time period when product water is produced. In another alternative, the value is a gradient of the power, voltage or current consumed by the CDI during the time period when product water is produced. A comparably high value of any of the indicated values indicates that the quality of the incoming water is low (thus has a high number of ions). A low value indicates that the quality of the incoming water is high (thus has a low number of ions). The value may in another alternative be the duration of a time period starting when the water is produced until the power, voltage or current consumed by the CDI reaches a saturation value. A low value (thus a short duration) here indicates that the quality of the incoming water is of low quality. A high value (thus a long duration) here indicates that the quality of the incoming water is of high quality. Thus, the determining S2 comprises to determine whether the obtained value meets at least one criterion. The obtained value is thus compared to one or several thresholds, as previously explained. The determining may also comprise to take the recovery rate into account when determining the quality of the incoming water, as previously explained in relation to step S4.

As explained, a time period of water production with the CDI where product water is produced (ions are removed from the water and collected by the CDI), is followed by a time period during which the CDI is flushed (to get rid of the collected ions), and thus produce concentrate water. The concentrate water, that here makes up the reject water from the CDI, may either be passed to drain or recirculated (to a point upstream the RO unit 3) and reused. Depending on for example the quality of the incoming water, the efficiency of the water purification apparatus is optimized, by controlling recirculation of reject water produced by the water purification apparatus. Thus, the method comprises controlling recirculation S3 of reject water produced by the water purification apparatus, based on a result of the determining(s) S2, in order to optimize efficiency of the water purification apparatus. If the result of the determining(s) have revealed that the incoming water is of low quality, reject water is not recirculated, or only a small amount is recirculated, during the time period during which the CDI is flushed. If the result of the determining(s) have revealed that the incoming water is of high quality, a larger amount of reject water is recirculated during the time period during which the CDI is flushed. Thus, upon determined that incoming water is of high quality, a larger amount of reject water is recirculated, than upon determined that incoming water is of low quality.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the scope of the appended claims.

The invention claimed is:

1. A method for optimizing efficiency of a water purification apparatus comprising a fluid circuit including a reverse osmosis (RO) unit that provides a permeate flow, and an electrically controlled deionization unit downstream from the RO unit that receives at least part of the permeate flow, the method comprising:

obtaining, using a sensor, a current or voltage value indicative of power consumption by the electrically controlled deionization unit;

determining whether the obtained current or voltage value meets at least one power consumption criterion; and controlling, using one or more valve units, recirculation of reject water produced by the water purification apparatus based on whether the obtained current or voltage value meets the at least one power consumption criterion, wherein the controlling comprises at least one of:

increasing the recirculation of reject water in response to determining that the obtained current or voltage value indicative of power consumption is below a first threshold, or decreasing the recirculation of reject water in response to determining that the obtained current or voltage value indicative of power consumption is above a second threshold.

2. The method according to claim 1, wherein the reject water comprises a reject flow from the RO unit, and the controlling comprises controlling a recirculation of the reject flow from the RO unit to an incoming flow of the RO unit.

3. The method according to claim 1, wherein the reject water comprises a reject flow from the electrically controlled deionization unit, and the controlling comprises controlling a recirculation of the reject flow from the electrically controlled deionization unit to an incoming flow of the RO unit.

4. The method according to claim 1, further comprising determining whether a recovery rate of the water purification apparatus meets at least one recovery rate criterion, wherein the recovery rate is a ratio of a product flow rate from the deionization unit to an incoming flow rate of incoming water to the RO unit.

5. The method according to claim 4, further comprising determining a quality of the incoming water, indicative of a number of ions in the incoming water, based on at least one of whether (i) the obtained current or voltage value meets the at least one power consumption criterion, or (ii) the recovery rate of the water purification apparatus meets the at least one recovery rate criterion.

6. The method according to claim 5, further comprising determining a high quality of the incoming water in response to:

determining that the obtained current or voltage value indicative of power consumption is below or equal to the first threshold, wherein the first threshold is equal to or lower than the second threshold, and determining the recovery rate of the water purification apparatus is above or equal to a first recovery rate threshold, wherein a second recovery rate threshold is equal to or lower than the first recovery rate threshold, and wherein the high quality indicates a low number of ions in the incoming water.

7. The method according to claim 6, further comprising determining a low quality of the incoming water in response to:

determining that the obtained current or voltage value indicative of power consumption is above the second threshold, and determining the recovery rate of the water purification apparatus is below the second recovery rate threshold, and wherein the low quality indicates a high number of ions in the incoming water.

8. The method according to claim 7, further comprising issuing a notification in response to determining that the obtained current or voltage value indicative of power consumption is above the second threshold and the recovery rate of the water purification apparatus is below the second recovery rate threshold.

9. The method according to claim 7, further comprising stopping water purification in response to determining that the obtained current or voltage value indicative of power consumption is above the second threshold and the recovery rate of the water purification apparatus is below a third recovery rate threshold.

10. The method according to claim 1, further comprising:

monitoring a conductivity of a product flow rate from the electrically controlled deionization unit; and determining an efficiency of the electrically controlled deionization unit based on whether the conductivity meets at least one conductivity criterion and the obtained current or voltage value indicative of power consumption meets the at least one power consumption criterion.

11. The method according to claim 10, further comprising determining that the electrically controlled deionization unit has insufficient efficiency in response to determining that the conductivity is increasing while the power consumption is stable during a same period of time.

12. The method according to claim 1, wherein the electrically controlled deionization unit is any of: an electrodeionization (EDI) unit, a capacitive deionization (CDI) unit, or an electrodialysis reversal (EDR) unit.

13. A water purification apparatus comprising:

a fluid circuit comprising:

a reverse osmosis (RO) unit arranged to provide a permeate flow, and an electrically controlled deionization unit arranged downstream from the RO unit to receive at least part of the permeate flow; and a control arrangement comprising a control unit configured to perform the following operations:

obtain, using a sensor, a current or voltage value indicative of power consumption by the electrically controlled deionization unit, determine whether the obtained current or voltage value meets at least one power consumption criterion, and control, using one or more valve units, recirculation of reject water produced by the water purification apparatus based on whether the obtained current or voltage value meets the at least one power consumption criterion, including at least one of (i) increasing the recirculation of reject water in response to a determination that the obtained current or voltage value indicative of power consumption is below a first threshold, or (ii) decreasing the recirculation of reject water in response to a determination that the obtained current or voltage value indicative of power consumption is above a second threshold.

14. The water purification apparatus according to claim 13, wherein the reject water comprises a reject flow from the RO unit and the control unit is configured to control the control arrangement to control recirculation of the reject flow from the RO unit to an incoming flow of the RO unit by means of a valve unit.

15. The water purification apparatus according to claim 13, wherein the reject water comprises a reject flow from the electrically controlled deionization unit and the control unit is configured to control the control arrangement to control recirculation of the reject flow from the electrically controlled deionization unit to an incoming flow of the RO unit by means of a valve unit.

16. The water purification apparatus according to claim 13, wherein the control unit is configured to determine whether a recovery rate of the water purification apparatus meets at least one recovery rate criterion, wherein the recovery rate is a ratio of a product flow rate from the deionization unit to an incoming flow rate of incoming water to the RO unit.

17. The water purification apparatus according to claim 16, wherein the control unit is configured to determine a quality of the incoming water, indicative of a number of ions in the incoming water, based on at least one of whether the obtained current or voltage value meets the at least one power consumption criterion or the recovery rate of the water purification apparatus meets the at least one recovery rate criterion.

18. The water purification apparatus according to claim 17, wherein the control unit is configured to determine a high quality of the incoming water in response to:
  determining that the obtained current or voltage value indicative of power consumption is below or equal to the first threshold, wherein the first threshold is equal to or lower than the second threshold, and
  determining that the recovery rate of the water purification apparatus is above or equal to a first recovery rate threshold, wherein a second recovery rate threshold is equal to or lower than the first recovery rate threshold, and wherein the high quality indicates a low number of ions in the incoming water.

19. The water purification apparatus according to claim 18, wherein the control unit is configured to determine a low quality of the incoming water in response to:
  determining that the obtained current or voltage value indicative of power consumption is above the second threshold, and
  determining that the recovery rate of the water purification apparatus is below the second recovery rate threshold, and wherein the low quality indicates a high number of ions in the incoming water.

20. The water purification apparatus according to claim 19, wherein the control unit is configured to issue a notification in response to determining that the obtained current or voltage value indicative of power consumption is above the second threshold and determining that the recovery rate of the water purification apparatus is below the second recovery rate threshold.

21. The water purification apparatus according to claim 19, wherein the control unit is configured to control the control arrangement to stop water purification in response to determining that the obtained current or voltage value indicative of power consumption is above the second threshold and the recovery rate of the water purification apparatus is below a third recovery rate threshold.

22. The water purification apparatus according to claim 13, wherein the control unit is configured to:
  monitor a conductivity of a product flow from the electrically controlled deionization unit, and
  determine an efficiency of the electrically controlled deionization unit based on whether the conductivity meets at least one conductivity criterion and the obtained current or voltage value indicative of power consumption meets the at least one power consumption criterion.

23. The water purification apparatus according to claim 22, wherein the control unit is configured to determine that the electrically controlled deionization unit has insufficient efficiency in response to determining that the conductivity is increasing while the power consumption is stable during a same period of time.

24. The water purification apparatus according to claim 13, wherein the electrically controlled deionization unit is any of: an electrodeionization (EDI) unit, a capacitive deionization (CDR) unit, or an electrodialysis reversal (FDR) unit.

25. A non-transitory, computer-readable medium storing instructions which, when executed by a processor of a water purification apparatus, cause the processor to:
  obtain, via a sensor, a current or voltage value indicative of power consumption by an electrically controlled deionization unit;
  determine whether the obtained current or voltage value meets at least one power consumption criterion; and
  control, using one or more valve units, recirculation of reject water produced by the water purification apparatus based on the determination, including increasing the recirculation of reject water in response to a determination that the obtained current or voltage value indicative of power consumption is below a first threshold or decreasing the recirculation of reject water in response to a determination that the obtained current or voltage value indicative of power consumption is above a second threshold.

* * * * *